(12) United States Patent
Wang et al.

(10) Patent No.: US 11,558,142 B2
(45) Date of Patent: Jan. 17, 2023

(54) TRANSPORT BLOCK SIZE (TBS) ADJUSTMENT INDICATION IN SIDELINK

(71) Applicant: QUALCOMM Incorporated, San Diego, CA (US)

(72) Inventors: Hua Wang, Basking Ridge, NJ (US); Sony Akkarakaran, Poway, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 17/100,411

(22) Filed: Nov. 20, 2020

(65) Prior Publication Data
US 2022/0166535 A1 May 26, 2022

(51) Int. Cl.
| | |
|---|---|
| *H04L 1/00* | (2006.01) |
| *H04B 7/06* | (2006.01) |
| *H04W 72/02* | (2009.01) |
| *H04W 76/27* | (2018.01) |
| *H04W 72/04* | (2009.01) |

(52) U.S. Cl.
CPC ......... *H04L 1/0007* (2013.01); *H04B 7/0626* (2013.01); *H04W 72/02* (2013.01); *H04W 72/042* (2013.01); *H04W 72/0453* (2013.01); *H04W 76/27* (2018.02)

(58) Field of Classification Search
CPC .... H04L 1/0007; H04B 7/0626; H04W 72/02; H04W 72/042; H04W 72/0453; H04W 76/27
See application file for complete search history.

(56) References Cited

U.S. PATENT DOCUMENTS

2019/0182859 A1\* 6/2019 Khoryaev ............. H04L 1/0003

FOREIGN PATENT DOCUMENTS

| CN | 113517956 A | * | 10/2021 | |
|---|---|---|---|---|
| WO | WO-2020088497 A1 | * | 5/2020 | ........... H04L 1/0027 |
| WO | WO-2020226405 A1 | * | 11/2020 | ........... H04L 5/0048 |

OTHER PUBLICATIONS

"3rd Generation Partnership Project, Technical Specification Group Radio Access Network, Evolved Universal Terrestrial Radio Access (E-UTRA), Multiplexing and Channel Coding (Release 15)", 3GPP TS 36.212 V15.0.1 (Jan. 2018), 214 Pages.

\* cited by examiner

*Primary Examiner* — Shailendra Kumar
(74) *Attorney, Agent, or Firm* — Norton Rose Fulbright LLP

(57) ABSTRACT

An apparatus for wireless communication includes a receiver and a transmitter. The transmitter is configured to transmit of a transport block (TB) via a sidelink that is associated with a wireless communication protocol. The wireless communication protocol specifies that a first transport block size (TBS) associated with the TB is based on a first set of parameters. The transmitter is further configured to transmit sidelink control information (SCI) associated with the TB via the sidelink, and the SCI includes a TBS adjustment value associated with the first TBS.

30 Claims, 8 Drawing Sheets

TRANSPORT BLOCK SIZE (TBS) ADJUSTMENT INDICATION IN SIDELINK

TECHNICAL FIELD

Aspects of this disclosure relate generally to wireless communication systems, and more particularly, to wireless communication systems that use transport blocks (TBs).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, an apparatus for wireless communication includes a receiver and a transmitter. The transmitter is configured to transmit of a transport block (TB) via a sidelink that is associated with a wireless communication protocol. The wireless communication protocol specifies that a first transport block size (TBS) associated with the TB is based on a first set of parameters. The transmitter is further configured to transmit sidelink control information (SCI) associated with the TB via the sidelink, and the SCI includes a TBS adjustment value associated with the first TBS.

In some other aspects, a method of wireless communication includes transmitting a TB via a sidelink that is associated with a wireless communication protocol. The wireless communication protocol specifies that a first TBS associated with the TB is based on a first set of parameters. The method further includes transmitting SCI associated with the TB via the sidelink. The SCI includes a TBS adjustment value associated with the first TBS.

In some other aspects, an apparatus for wireless communication includes a transmitter and a receiver. The receiver is configured to receive a TB via a sidelink that is associated with a wireless communication protocol. The wireless communication protocol specifies that a first TBS associated with the TB is based on a first set of parameters. The receiver is further configured to receive SCI associated with the TB via the sidelink, and the SCI includes a TBS adjustment value associated with the first TBS.

In some other aspects, a method of wireless communication includes receiving a TB via a sidelink that is associated with a wireless communication protocol. The wireless communication protocol specifies that a first TBS associated with the TB is based on a first set of parameters. The method further includes receiving SCI associated with the TB via the sidelink. The SCI includes a TBS adjustment value associated with the first TBS.

DETAILED DESCRIPTION

Figure 1:
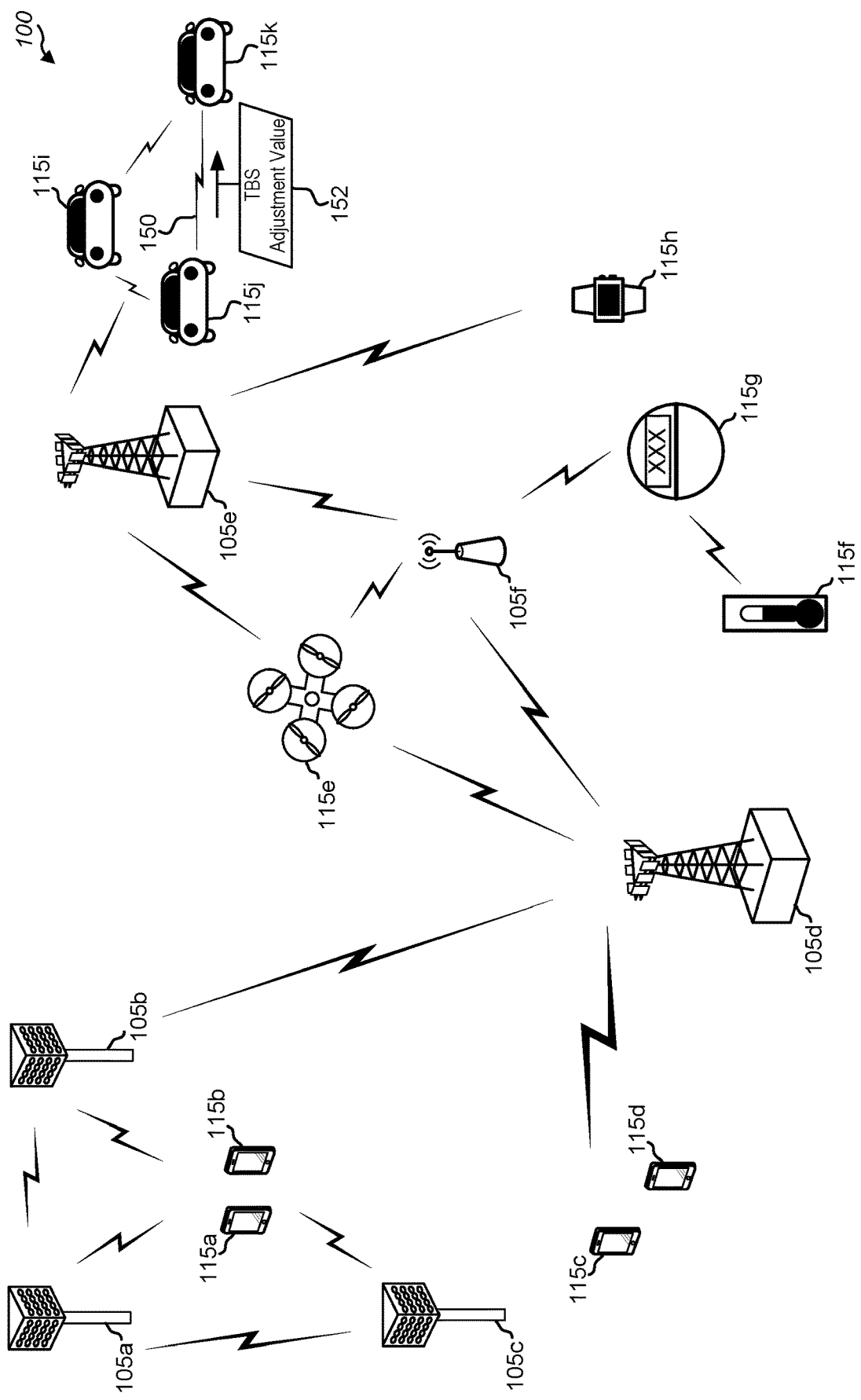
FIG. 1 is a block diagram illustrating an example of wireless communication system according to some aspects of the disclosure.

Vehicle-to-everything (V2X) wireless communication protocols enable sharing of data from a vehicle to other devices and vice versa. For example, an on-board unit (OBU) of a vehicle may share data indicating road conditions, accident information, and other data to a roadside unit (RSU), a base station, or to one or more other devices via a sidelink. In some implementations, the data may be included in a transport block (TB) having a transport block size (TBS). The TBS may be determined dynamically based on certain criteria such as resource availability, channel conditions, and other parameters.

To enable communication between a transmitting vehicle and a receiving vehicle, a wireless communication protocol used by the transmitting vehicle and the receiving vehicle may specify how the TBS is to be determined. For example, the wireless communication protocol may specify that the TBS is to be determined based on a particular set of parameters that are known to the transmitting vehicle and the receiving vehicle. In some cases, one or more of the parameters may change prior to transmission of the TB, causing the determined TBS to also change, and resulting in a TBS mismatch. In such examples, the actual TBS of the TB may be different than the TBS that is "expected" by the receiving device. If the actual TBS is smaller than the expected TBS, a zero padding technique may be used to "fill" the extra space of the TB that results from the smaller TBS. In some cases, zero padding may be inefficient (by transmitting non-useful bits) or may be infeasible (such as in the case of a retransmission, which may use soft combining that is incompatible with zero padded bits). If the actual TBS is larger than the expected TBS, then the TB may be larger than expected by the receiver, which may lead the receiver to incorrectly decode the TB (based on an incorrect TBS).

A wireless communication system according to some aspects of the disclosure may use a TBS adjustment indicator to indicate whether, and how much, a receiving device of a TB is to adjust an "expected" TBS to determine the "actual" TBS of the TB. To illustrate, the TBS adjustment indicator may specify a scaling factor by which the expected TBS is to be increased or decreased. Alternatively or in addition, the TBS adjustment indicator may specify an offset value, such as a TBS index value offset value by which a TBS index value corresponding to the expected TBS is to be adjusted to determine a TBS index value corresponding to the actual TBS, or a parameter offset indicating an amount by which a parameter of the set of parameters (such as an overhead parameter) is to be adjusted. The receiving device may use the adjusted parameter to recalculate the TBS of the TB, resulting in the actual TBS.

By transmitting a TBS adjustment indicator via a sidelink, a receiving device in a V2X wireless communication system may identify whether an actual TBS differs from an expected TBS. The receiving device may recalculate the TBS in cases in which the TBS has changed. As a result, instances of data loss associated with a TBS mismatch may be reduced or avoided.

To further illustrate, aspects of the disclosure may be used in connection with wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications.

In some examples, at least some of the devices illustrated in FIG. 1 communicate within a vehicle-to-everything (V2X) communication network. For example, the UEs 115i-k may correspond to vehicles that communicate within a V2X wireless communication network. To further illustrate, the UE 115j may communicate with the UE 115k via a sidelink 150 of a V2X wireless communication network. In some aspects of the disclosure, the UE 115j may transmit (e.g., to the UE 115k) a TBS adjustment value 152 via the sidelink 150, as described further below. Alternatively or in addition, one or more other devices may transmit or receive the TBS adjustment value 152. For example, one or both of a base station 105 or a relay device may transmit the TBS adjustment value 152.

Figure 2:
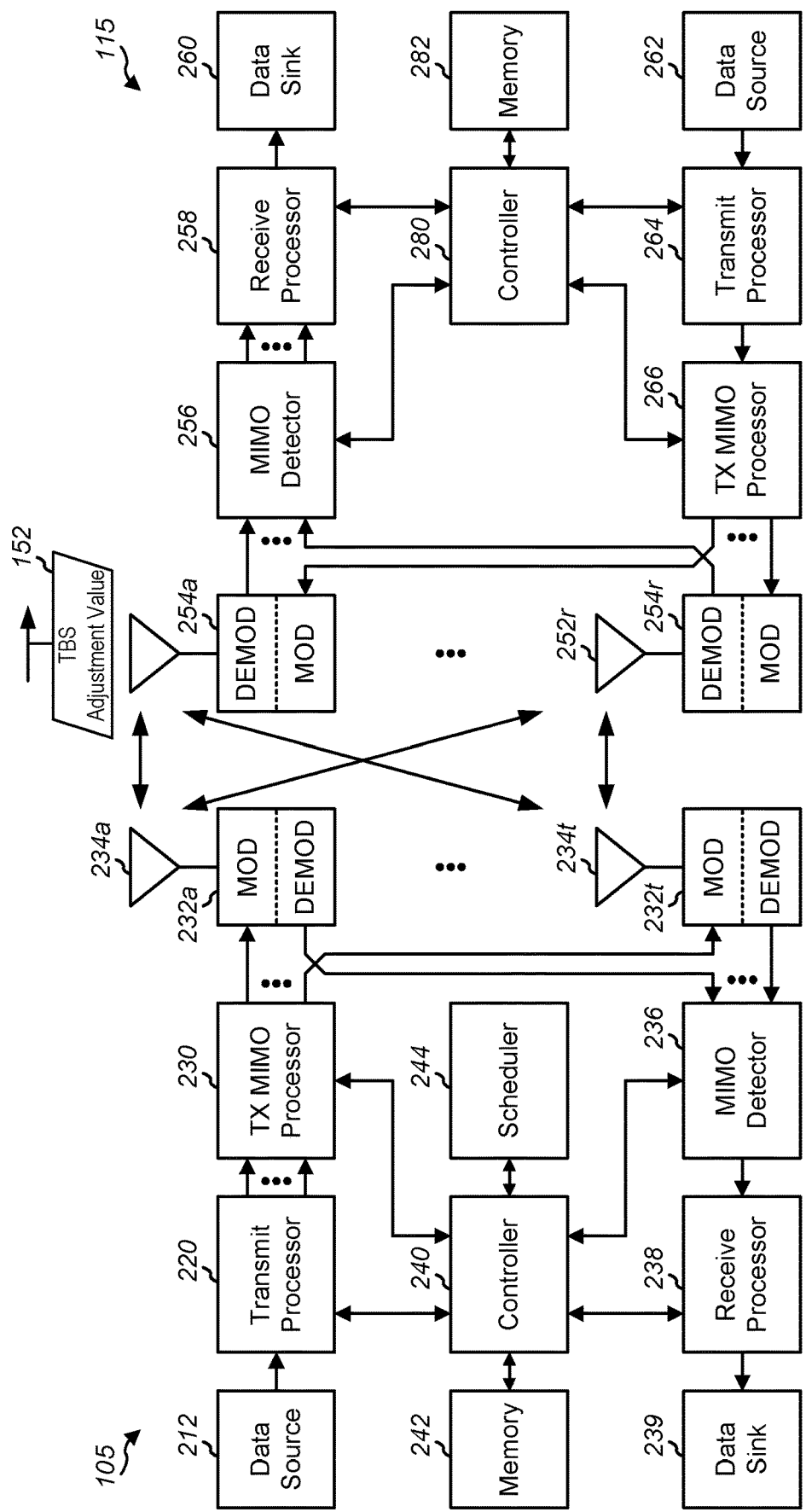
FIG. 2 is a block diagram illustrating examples of a base station and a user equipment (UE) according to some aspects of the disclosure.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein. As an example, the controller 280 may execute instructions to transmit or to receive the TBS adjustment value 152 via the sidelink 150 of FIG. 1. Memories 242 and 282 may store data and instructions for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Some V2X wireless communication protocols use dynamic grants (DGs) and configured grants (CGs) for sidelinks (e.g., a PSCCH or PSSCH). A DG may provide a one-time grant of sidelink resources, which may be responsive to dynamic demand for sidelink communication. A CG may provide a grant of sidelink resources enabling continued, periodic, or repeated sidelink communication. A first type of sidelink resource grant (Type 1) may use RRC signaling to configure a UE with resources of a CG. A second type of sidelink resource grant (Type 2) of may use DCI over a PDCCH to configure a UE with resources of a DG or a CG. For example, the DCI may be a DG and may allocate resources for sidelink communication. In some other examples, the DCI may be a CG and may activate or deactivate a CG for sidelink communication.

Resource allocation for sidelink communication may be performed according to one or more modes, such as a first mode (Mode 1) or a second mode (Mode 2). In the first mode (Mode 1), a base station, such as a gNB, may assign one or more resources to be used by a TX UE and by an RX UE. To illustrate, the base station may transmit DCI in a Uu interface to the TX UE to grant the one or more resources to the TX UE for sidelink communication. In the second mode (Mode 2), the TX UE may autonomously select the one or more resources for the sidelink communication (e.g., instead of the base station assigning the one or more resources). Operation of an RX UE may be the same for both the first mode (Mode 1) and the second mode (Mode 2).

Figure 3:
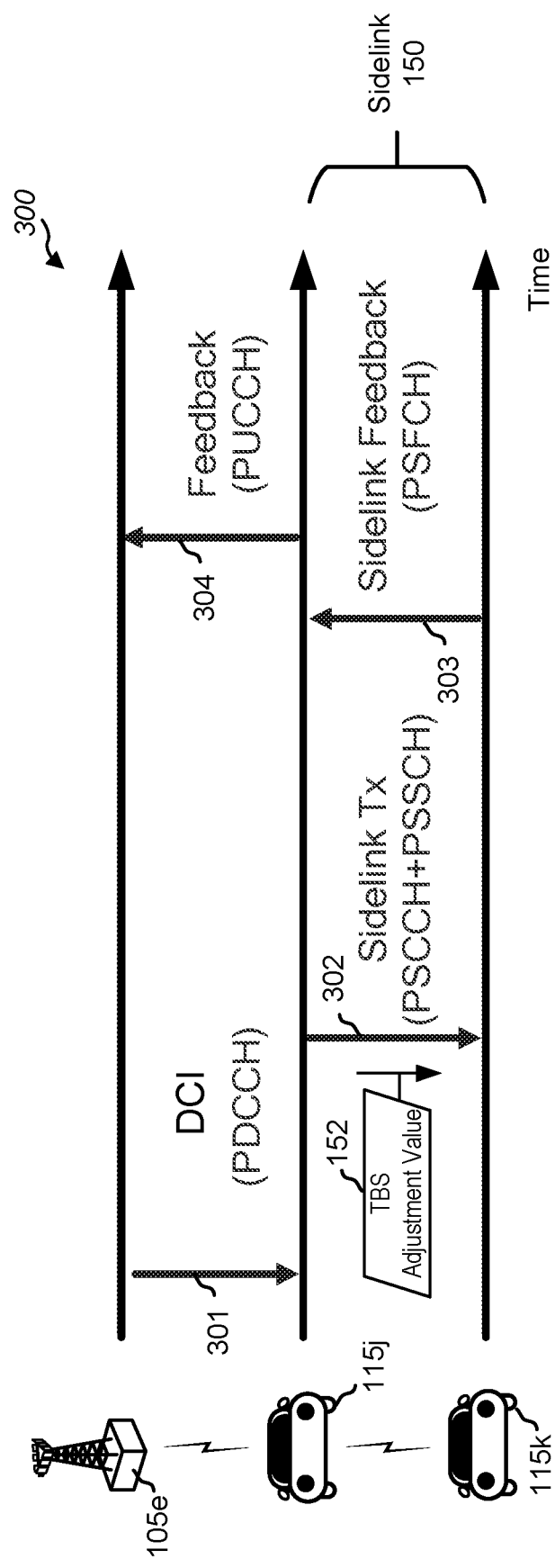
FIG. 3 is a diagram illustrating examples of operations that may be performed in connection with a vehicle-to-everything (V2X) wireless communication network according to some aspects of the disclosure.

FIG. 3 is a diagram illustrating examples of operations 300 that may be performed in connection with a V2X wireless communication network according to some aspects of the disclosure. The operations 300 may be described with reference to the UEs 115j, 115k and the macro base station 105e. In some other examples, the operations 300 may be performed with respect to other UEs and other UE configurations.

The operations 300 may illustrate an example of the first mode (Mode 1) in which resource allocation of Tx resources for sidelink communications is performed by the base station 105e (e.g., through DCI 3_0). DCI 3_0 may be transmitted by the base station 105e to allocate time and frequency resources and may indicate transmission timing. The first mode (Mode 1) may support DGs, CGs of type 1, and CGs of type 2. A CG of type 1 may be activated via RRC signaling from the base station 105e. An MCS may be determined by the TX UE, such as UE 115k, within parameters set by the base station 105e.

In the operations 300 of FIG. 3, the base station 105a may transmit DCI to the UE 115j (e.g., using a PDCCH), at 301. In some examples, the DCI has a format 3_0 and may indicate a DG or CG of Type 2 to the UE 115j. At 302, the UE 115j may transmit SCI to the UE 115k.

At 302, the UE 115j may transmit one or more TBs to the UE 115k and SCI to the UE 115k via the sidelink 150. The SCI may include the TBS adjustment value 152. The sidelink 150 may include a physical sidelink control channel (PSCCH) and a physical sidelink shared channel (PSSCH). The sidelink 150 may optionally include a physical sidelink feedback channel (PSFCH).

At 303, the UE 115k may transmit sidelink feedback to the UE 115j via the sidelink 150 (e.g., via the PSFCH), such as an acknowledgement (ACK) or a negative-acknowledgement (NACK). At 304, the UE 115j may forward the sidelink feedback to the base station 105e (e.g., using a PUCCH). The base station 105e may perform one or more operations based on the sidelink feedback, such as resource allocation, as an illustrative example.

Figure 4:
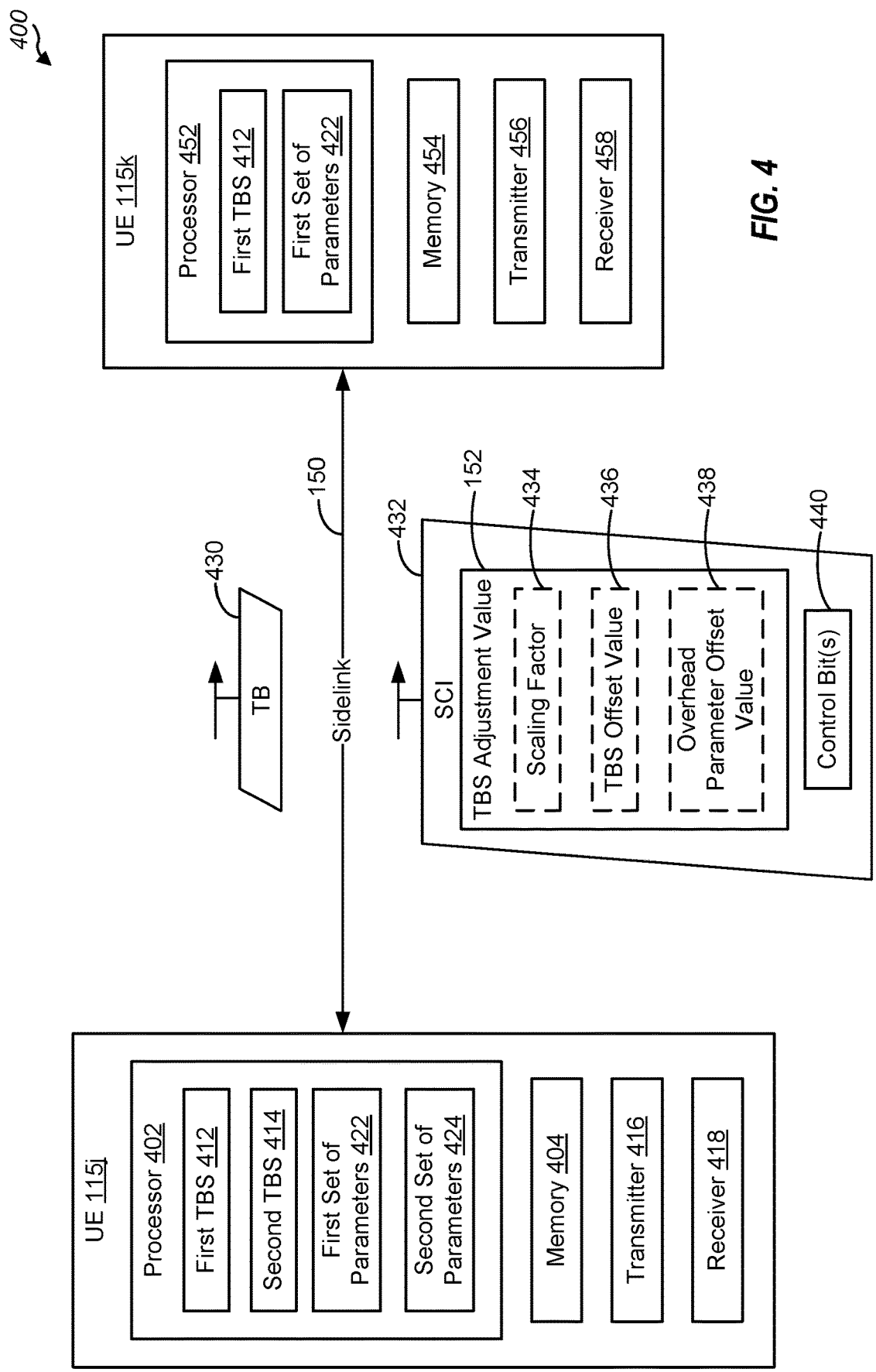
FIG. 4 is a block diagram illustrating an example of a wireless communication system according to some aspects of the disclosure.

FIG. 4 is a block diagram of an example of a wireless communication system 400 according to some aspects of the disclosure. In some examples, the wireless communication system 400 may implement one or more aspects of the wireless network 100. For example, the wireless communication system 400 may include the UE 115j and the UE 115k. The wireless communication system 400 may include or correspond to a vehicle-based wireless communication network, such as a V2X wireless communication network, a vehicle-to-vehicle (V2V) wireless communication network, a vehicle-to-infrastructure (V2I) wireless communication network, a vehicle-to-network (V2N) wireless communication network, a vehicle-to-pedestrian (V2P) wireless communication network, a vehicle-to-device (V2D) wireless communication network, a vehicle-to-grid (V2G) wireless communication network, one or more other wireless communication networks, or a combination thereof, as illustrative, non-limiting examples.

The UE 115j may include one or more processors 402 (hereinafter referred to collectively as "processor 402"), one or more memory devices 404 (hereinafter referred to collectively as "memory 404"), one or more transmitters 416 (hereinafter referred to collectively as "transmitter 416"), and one or more receivers 418 (hereinafter referred to collectively as "receiver 418"). The processor 402 may execute instructions stored in memory 404 to perform one or more operations described herein. In some implementations, processor 402 includes or corresponds to the controller 280, and memory 404 includes or corresponds to the memory 282.

The transmitter 416 may transmit reference signals, control information, and data to one or more other devices, and the receiver 418 may receive references signals, synchronization signals, control information, and data from one or more other devices. For example, the transmitter 416 may transmit signaling, control information, and data to the UE 115k, and the receiver 418 may receive signaling, control information, and data from the UE 115k. In some implementations, the transmitter 416 and the receiver 418 may be integrated in one or more transceivers. Additionally or alternatively, the transmitter 416 or the receiver 418 may include or correspond to one or more components of the UE 115 described with reference to FIG. 2.

The UE 115k may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). The processor 452 may be configured to execute instructions stored in the memory 454 to perform one or more operations described herein. In some implementations, the processor 452 includes or corresponds to the controller 240, the memory 454 includes or corresponds to memory 242.

The transmitter 456 is configured to transmit reference signals, synchronization signals, control information, and data to one or more other devices, and the receiver 458 is configured to receive reference signals, control information, and data from one or more other devices. For example, the transmitter 456 may transmit signaling, control information, and data to the UE 115*j*, and receiver 458 may receive signaling, control information, and data from the UE 115*j*. In some implementations, the transmitter 456 and the receiver 458 may be integrated in one or more transceivers. Additionally or alternatively, the transmitter 416 or the receiver 418 may include or correspond to one or more components of the UE 115 described with reference to FIG. 2.

During operation, the UE 115*j* and the UE 115*k* may communicate via the sidelink 150 based on a wireless communication protocol, such as based on a V2X wireless communication protocol, a V2V wireless communication protocol, a V2I wireless communication protocol, a V2N wireless communication protocol, a V2P wireless communication protocol, a V2D wireless communication protocol, a V2G wireless communication protocol, one or more other wireless communication protocols, or a combination thereof, as illustrative, non-limiting examples.

To illustrate, the UE 115*j* may transmit a TB 430 via the sidelink 150 to the UE 115*k* via the wireless communication protocol. The wireless communication protocol may specify that a first TBS 412 of the TB 430 is to be determined based on a first set of parameters 422. One or more of the first set of parameters 422 may be configured by a base station 105, such as by RRC configuration messages transmitted by the base station 105 to the UE 115*j* and to the UE 115*k*. To further illustrate, the first TBS 412 may be based on a number of resource elements (REs) allocated to the sidelink 150 per physical resource block (PRB). The number of REs may be selected from a group specified by the wireless communication protocol. For example, the wireless communication protocol may specify that the number of REs is to correspond to one of 10 resource blocks (RBs), 15 RBs, 20 RBs, 25 RBs, 50 RBs, 75 RBs, or 100 RBs. The wireless communication protocol may also specify that the first set of parameters 422 is to include a number of subcarriers per PRB, a number of symbols per slot, a number of symbols associated with a physical shared feedback channel (PSFCH), an overhead parameter, and a number of REs associated with a demodulation reference signal (DMRS).

To further illustrate, in some examples, the wireless communication specifies a process for determining TBSs, such as the first TBS 412. The UEs 115*j*-*k* may each perform the process to determine the first TBS 412. The process may include determining the number of REs allocated to the sidelink 150 per PRB according to Equation 1:

$$N'_{RE} = N_{SC}^{RB}(N_{symb}^{SH} - N_{symb}^{PSFCH}) - N_{oh}^{PRB} - N_{RE}^{DMRS}$$ (Equation 1).

In Equation 1, N'$_{RE}$ may correspond to the number of REs allocated to the sidelink 150 per PRB, N$_{SC}^{RB}$ may correspond to the number of subcarriers per PRB, N$_{symb}^{SH}$ may correspond to the number of symbols per slot, N$_{symb}^{PSFCH}$ may correspond to the number of symbols associated with a PSFCH, N$_{oh}^{PRB}$ may correspond to the overhead parameter (e.g., a reduction in REs available for data transfer, which may be configured by a base station 105 using RRC signaling), and N$_{RE}^{DMRS}$ may correspond to the number of REs associated with a DMRS.

The process may further include determining a number of REs allocated to a PSSCH. In some implementations, the number of REs allocated to the PSSCH is determined according to Equation 2:

$$N_{RE} = N'_{RE} \cdot n_{PRB} - N_{RE}^{SCI,1} - N_{RE}^{SCI,2}$$ (Equation 2).

In Equation 2, N$_{RE}$ may correspond to the number of REs allocated to a PSSCH, N'$_{RE}$ may correspond to the number of REs allocated to the sidelink 150 per PRB, n$_{PRB}$ may correspond to the number of PRBs allocated to the PSSCH, N$_{RE}^{SCI,1}$ may correspond to the number of REs associated with a PSCCH and a PSCCH DMRS, and N$_{RE}^{SCI,2}$ may correspond to a number of coded modulation symbols, such as a number of coded modulation symbols associated with a second-stage SCI transmission (which may occur prior to a duplication associated with a second layer, if present).

The process may further include determining a number of information bits based on the number of REs allocated to a PSSCH. For example, the number of information bits may be determined according to Equation 3:

$$N_{info} = N_{RE} \cdot R \cdot Q_m \cdot Q_m \cdot v$$ (Equation 3).

In Equation 3, X may correspond to the number of information bits, X may correspond to the number of REs allocated to a PSSCH, R may correspond to a modulation order associated with transmissions by the UE 115*j* via the sidelink 150, Q$_m$ may correspond to a target code rate associated with transmissions by the UE 115*j* via the sidelink 150, and V may correspond to a number of layers associated with transmissions by the UE 115*j* via the sidelink 150.

The process may further include determining a TBS (such as the first TBS 412) based on the number of information bits, such as by using a table specified by the wireless communication protocol (e.g., based on the number of information bits failing to satisfy a threshold value), using an equation specified by the wireless communication protocol (e.g., based on the number of information bits satisfying the threshold value), or using another technique. To illustrate, as the number of information bits increases, the TBS may increase. Accordingly, the first set of parameters 422 may include any of the parameters illustrated with reference to Equations 1, 2, and 3.

In some implementations, by specifying that the first TBS 412 is to be determined using the first set of parameters 422, both the UE 115*j* and the UE 115*k* may "agree" on the first TBS 412 of the TB 430. As a result, the UE 115*k* may determine the first TBS 412, which may enable the UE 115*k* to "expect" a particular number of bits of the TB 430.

In some cases, the UE 115*j* may determine a change of one or more parameters included in the first set of parameters 422. For example, parameters may be changed in response to feedback (such as an ACK or a NACK) received via a PSFCH, which may change the number of symbols associated with a PSFCH. In some cases, an MCS or a DMRS pattern may change, resulting in a change to the modulation order, the target code rate, the number of layers, or the number of REs associated with a DMRS. Based on the change, the UE 115*j* may determine a second set of parameters 424 and may determine a second TBS 414 of the TB 430 based on the second set of parameters 424 (e.g., using the process described with reference to Equations 1, 2, and 3). The first TBS 412 may be referred to as a "calculated" or "theoretical" TBS of the TB 430, and the second TBS 414 may be referred to as an "actual" TBS of the TB 430.

In some cases, the UE 115*k* may be unaware of the change of one or more parameters included in the first set of parameters 422. For example, after RRC configuration of a first value of overhead parameter, the UE 115*j* may determine a second value of the overhead parameter (to replace the first value). In this case, the UE 115*j* may determine the second TBS 414, and the UE 115*k* may still "expect" the first TBS 412. As another example, the UE 115*j* may indicate a first MCS to the UE 115*k* using SCI. The UE 115*j* may subsequently change from the first MCS to the second MCS (resulting in a change from the first TBS 412 to the second TBS 414), and the UE 115k may be unaware of the change.

The UE 115j may transmit the TB 430 (e.g., via the sidelink 150) based on the second TBS 414 (instead of the first TBS 412), and the second TBS 414 may be different than the first TBS 412. If the second TBS 414 is different than the first TBS 412, the UE 115k may "expect" an incorrect TBS of the TB 430, which may result in data loss (e.g., by terminating a receive operation prior to completing reception of the TB) or inefficiency (e.g., by performing the receive operation for longer than needed to receive the TB 430).

In some aspects of the disclosure, the UE 115j may transmit the TBS adjustment value 152 to indicate an amount that a receiving device (such as the UE 115k) is to adjust the first TBS 412 to determine the second TBS 414 (or to indicate that no adjustment is to be made to the first TBS 412). In some examples, the UE 115j transmits sidelink control information (SCI) 432 associated with the TB via the sidelink 150, and the SCI 432 includes the TBS adjustment value 152. In some examples, the sidelink 150 includes one or both of a data channel or a control channel, such as a PSCCH, a PSSCH, or both. The SCI may include one or both of a source identifier (ID) of the UE 115j or a destination ID of the UE 115k. In some implementations, after transmission of the TB 430 and the SCI 432, the UE 115k may transmit one or more feedback signals (such as an ACK or a NACK) to the UE 115j via a PSFCH.

To further illustrate, in some examples, the TBS adjustment value 152 includes or corresponds to a scaling factor 434 to be applied to the first TBS 412 to determine the second TBS 414. In some examples, the scaling factor 434 may include one or more bits. Table 1 illustrates an example of a two-bit scaling factor 434. Other examples are also within the scope of the disclosure (such as a one-bit scaling factor 434, a three-or-more-bit scaling factor 434, or different operations than illustrated in the example of Table 1).

TABLE 1

| Scaling factor | Operation |
| --- | --- |
| 00 | No Scaling |
| 01 | Scale by a factor of 0.5 |
| 10 | Scale by factor of 0.25 |
| 11 | Scale by a factor of 2 |

In the example of Table 1, a scaling factor 434 of "00" may indicate that no scaling is to be performed. In this case, the TB 430 may have the first TBS 412. A scaling factor 434 of "01," "10," and "11," may indicate scaling by factors of 0.5, 0.25, and 2, respectively. For example, if the first TBS 412 corresponds to 50 RBs, and if the second TBS 414 corresponds to 25 RBs, then the scaling factor 434 may have a value of "01" (to indicate scaling by a factor of 0.5). As another example, if the first TBS 412 corresponds to 10 RBs, and if the second TBS 414 corresponds to 20 RBs, then the scaling factor 434 may have a value of "11" (to indicate scaling by a factor of 2).

Alternatively or in addition, the TBS adjustment value 152 may include or correspond to a TBS offset value 436 indicating a change in a TBS index value corresponding to the first TBS 412. To illustrate, the first TBS 412 may correspond to one of a first TBS index value associated with 10 RBs, a second TBS index value associated with 15 RBs, a third TBS index value associated with 20 RBs, a fourth TBS index value associated with 25 RBs, a fifth TBS index value associated with 50 RBs, a sixth TBS index value associated with 75 RBs, or a seventh TBS index value associated with 100 RBs. The TBS offset value 436 may adjust the TB 430 from one of the first through seventh TBS index values (corresponding to the first TBS 412) to another of the first through seventh TBS index values (corresponding to the second TBS 414).

To further illustrate, Table 2 illustrates an example of a two-bit TBS offset value 436. Other examples are also within the scope of the disclosure (such as a one-bit TBS offset value 436, a three-or-more-bit TBS offset value 436, or different operations than illustrated in the example of Table 2).

TABLE 2

| TBS Offset Value | Operation |
| --- | --- |
| 00 | No change |
| 01 | Next higher TBS index value |
| 10 | Next lower TBS index value |
| 11 | (Reserved) |

In the example of Table 2, a TBS offset value 436 of "00" may indicate no change to the first TBS 412. In this case, the TB 430 may have the first TBS 412. A TBS offset value 436 of "01" or "10" may indicate that the TBS index value corresponding to the first TBS 412 is to be increased to a next higher TBS index value or to be reduced to a next lower TBS index value, respectively. For example, if the first TBS 412 corresponds to 50 RBs, and if the second TBS 414 corresponds to 25 RBs, then the scaling factor 434 may have a value of "10" (to indicate reduction from the TBS index value corresponding to 50 RBs to the next lower TBS index value corresponding to 25 RBs). As another example, if the first TBS 412 corresponds to 10 RBs, and if the second TBS 414 corresponds to 20 RBs, then the scaling factor 434 may have a value of "01" (to indicate an increase from the TBS index value corresponding to 10 RBs to the next higher TBS index value corresponding to 20 RBs). In the example of Table 2, the value of "11" may correspond to a reserved value or another operation.

Alternatively or in addition, the TBS adjustment value 152 may include or correspond to an offset in one or more parameters of the first set of parameters 422 relative to the second set of parameters 424, such as an overhead parameter offset value 438. The overhead parameter offset value 438 may indicate a change in a number of bits associated with an overhead parameter of the first set of parameters 422. In some examples, the overhead parameter may correspond to $N_{oh}^{PRB}$. To further illustrate, Table 3 illustrates an example of a two-bit overhead parameter offset value 438. Other examples are also within the scope of the disclosure (such as a one-bit overhead parameter offset value 438, a three-or-more-bit overhead parameter offset value 438, or different operations than illustrated in the example of Table 3).

TABLE 3

| Overhead parameter offset value | Operation |
| --- | --- |
| 00 | No change |
| 01 | Add three REs to overhead parameter |
| 10 | Add five REs to overhead parameter |
| 11 | Subtract three REs from overhead parameter |

In the example of Table 3, an overhead parameter offset value 438 of "00" may indicate no change to the first TBS 412. In this case, the TB 430 may have the first TBS 412. An overhead parameter offset value 438 of "01," "10," or "11" may indicate adjustment of the overhead parameter, such as by adding three bits to the overhead parameter, by adding five bits to the overhead parameter, or by subtracting three bits from the overhead parameter, respectively. For example, if the overhead parameter corresponds to six REs, and if the overhead parameter offset value 438 corresponds to "01," then a receiving device (such as the UE 115k) may determine the second TBS 414 based on an overhead parameter of nine REs. As another example, if the overhead parameter corresponds to 12 REs, and if the overhead parameter offset value 438 corresponds to "10," then a receiving device (such as the UE 115k) may determine the second TBS 414 based on an overhead parameter of 17 REs.

In some examples, the SCI 432 includes one or more control bits 440. The one or more control bits 440 may indicate one or more parameters associated with the TBS adjustment value 152. For example, the one or more control bits 440 may indicate whether the TBS adjustment value corresponds to the scaling factor 434 or an offset value, such as the TBS offset value 436 or the overhead parameter offset value 438. In such examples, the UE 115j may dynamically adjust the first TBS 412 using the scaling factor 434, the TBS offset value 436, or the overhead parameter offset value 438 based on the one or more control bits 440. In some examples, the one or more control bits 440 are configured by a base station 105 using RRC signaling.

Although the scaling factor 434, the TBS offset value 436, and the overhead parameter offset value 438 have been described separately for illustration, in some implementations, the TBS adjustment value 152 may include the scaling factor 434 and may further include an offset associated with the first TBS 412 (such as the TBS offset value 436 or the overhead parameter offset value 438). In this case, a receiving device (such as the UE 115k) may adjust the first TBS 412 based on the scaling factor 434 and the offset in a particular order (e.g., by applying the scaling factor 434 to the first TBS 412 prior to, or after, applying the offset to the first TBS 412). To illustrate, the order of applying the scaling factor 434 and the offset may be specified by a wireless communication protocol used by the UEs 115j-115k, such as a V2X wireless communication protocol. In some other examples, the order of applying the scaling factor 434 and the offset is determined using radio resource control (RRC) signaling (e.g., where the base station 105 indicates the order using one or more RRC configuration messages). In another example, the order of applying the scaling factor 434 and the offset is indicated using downlink control information (DCI) (e.g., where the base station 105 indicates the order using one or more DCI messages, such as the DCI described with reference to FIG. 3, at 301). In some other examples, the order of applying the scaling factor 434 and the offset is indicated by the SCI 432 (e.g., based on a value of a particular bit of the one or more control bits 440).

It is noted that the TB 430 may correspond to an initial transmission of a TB or to a retransmission of a TB (e.g., in response to the UE 115j receiving a NACK from the UE 115k via a PSFCH). Accordingly, a TBS adjustment value 152 may be transmitted via the sidelink 150 to indicate a TBS of an initial transmission of the TB 430, to indicate a TBS of a retransmission of the TB 430, or both. In addition, channel state information (CSI) associated with the TB 430 may be based on a retransmission format irrespective of whether the TB 430 corresponds to an initial transmission or a retransmission. Further, in some cases, the TBS of the initial transmission may differ from the TBS of the retransmission (such as if one or more parameters of the first set of parameters 422 change after the initial transmission and prior to the retransmission). In this case, use of the TBS adjustment value 152 may indicate to a receiving device that the TBS of the retransmission is different than the TBS of the initial transmission, which may affect operation of the receiving device in some cases. For example, in some implementations, soft combining of bits of different transmissions may be incompatible with transmissions of different TBSs. In such examples, a receiving device may avoid performing soft combining of bits of an initial transmission and a retransmission upon determining, based on the TBS adjustment value 152, that the TBS of the retransmission is different than the TBS of the initial transmission.

Although certain examples have been described separately for convenience, such examples may be combined without departing from the scope of the disclosure. To illustrate, the UE 115j may receive, from the UE 115k, a TB and SCI that indicates a TBS adjustment value associated with the TB. Thus, a UE 115 may both transmit and receive TBs and SCI indicating TBS adjustment values associated with the TBs.

Figure 5:
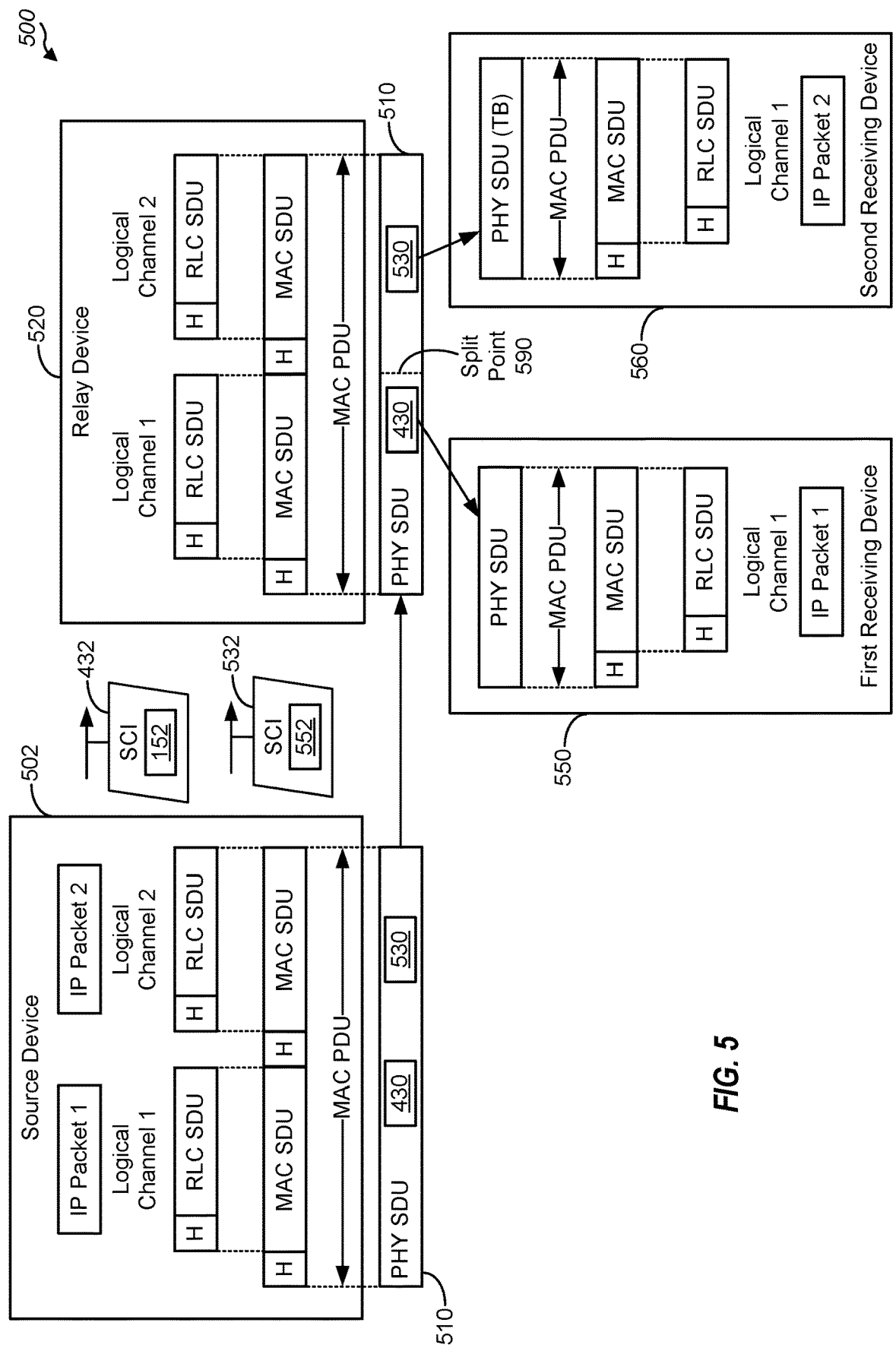
FIG. 5 is a block diagram illustrating another example of a wireless communication system according to some aspects of the disclosure.

FIG. 5 is a block diagram illustrating an example of a wireless communication system 500 according to some aspects of the disclosure. The wireless communication system 500 may include a source device 502, a relay device 520, a first receiving device 550, and a second receiving device 560. In some examples, the source device 502 corresponds to a base station (e.g., the base station 105) or a UE, such as the UE 115j. The first receiving device 550 may correspond to a UE (e.g., the UE 115k), and the second receiving device 560 may correspond to another UE 115, such as the UE 115i of FIG. 1. In some other examples, the first receiving device 550 and the second receiving device 560 correspond to logical devices of a single device (e.g., the UE 115k). The relay device 520 may correspond to a UE or to another device.

The source device 502 may transmit, via the relay device 520, the TB 430 to first receiving device 550 and a second TB 530 to the second receiving device 560. In some examples, the TB 430 includes or corresponds to a first Internet Protocol (IP) packet ("IP packet 1") associated with a first logical channel, and the second TB 530 includes or corresponds to a second IP packet ("IP packet 2") associated with a second logical channel. The source device 502 may transmit the TB 430 and the second TB 530 via a data unit, such as a physical layer (PHY) service data unit (SDU) 510 having a length corresponding to a medium access control (MAC) packet data unit (PDU). To generate the PHY SDU 510, the source device 502 may generate or use a radio link control (RLC) SDU and a MAC SDU, each of which may be associated with a header (H).

The relay device 520 may separate the TB 430 from the second TB 530 at a split point 590 that is based on the TBS adjustment value 152. For example, the relay device 520 may use the TBS adjustment value 152 to determine the second TBS 414 of the TB 430 and may determine the split point 590 based on the second TBS 414. After separating the TB 430 from the second TB 530 at the split point 590, the relay device 520 may provide the TB 430 to the first receiving device 550 and may provide the second TB 530 to the second receiving device 560.

In some examples, the source device 502 provides the SCI 432 and the TBS adjustment value 152 to the relay device 520, and the relay device 520 provides the SCI 432 and the TBS adjustment value 152 to the first receiving device 550. The source device 502 may provide second SCI 532 associated with the second TB 530 to the relay device 520. The second SCI 532 may include a second TBS adjustment value 552 associated with the second TB 530, and the relay device 520 may provide the second SCI 532 and the second TBS adjustment value 552 to the second receiving device 560. In some such examples, the first receiving device 550 and the second receiving device 560 may correspond to distinct devices, such as the UEs 115k and 115i.

In some other examples, the first receiving device 550 and the second receiving device 560 may correspond to logical devices of a single device, such as the UE 115k. The first receiving device 550 may be associated with a first component carrier (CC), the second receiving device 560 may be associated with a second CC different than the first CC. In such examples, the relay device 520 may provide one of the TBS adjustment value 152 or the second TBS adjustment value 552 to the receiving devices 550, 560. For example, the relay device 520 may provide the SCI 432 and the TBS adjustment value 152 to both the first receiving device 550 and the second receiving device 560 to schedule the first CC and the second CC.

One or more aspects described herein may improve operation of a wireless communication system. For example, by transmitting the TBS adjustment value 152 via the sidelink 150, a receiving device in a V2X wireless communication system may identify whether an actual TBS of the TB 430 (e.g., the first TBS 412) differs from an expected TBS of the TB 430 (e.g., the second TBS 414). The receiving device may recalculate the TBS in cases in which the TBS has changed. As a result, instances of data loss associated with a TBS mismatch may be reduced or avoided.

Figure 6:
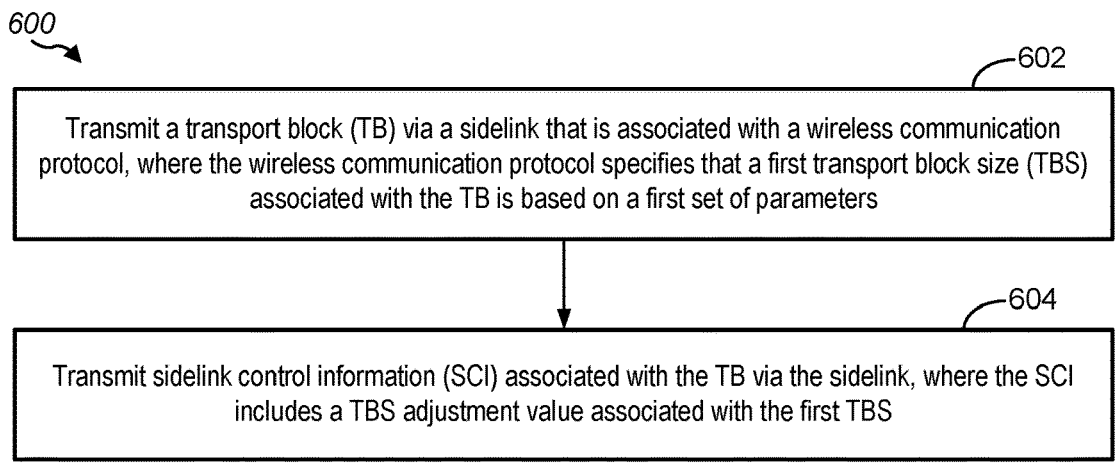
FIG. 6 is a flow diagram illustrating an example of a method of wireless communication according to some aspects of the disclosure.

FIG. 6 is a flow diagram of a method 600 of wireless communication according to some aspects of the disclosure. In some examples, the method 600 is performed by a transmitting device of a TB, such as by the UE 115j or by the source device 502.

The method 600 includes transmitting a TB via a sidelink that is associated with a wireless communication protocol, at 602. The wireless communication protocol specifies that a first TBS associated with the TB is based on a first set of parameters. To illustrate, the transmitter 416 may be configured to transmit the TB 430 via the sidelink 150. The sidelink 150 may be associated with a V2X wireless communication protocol that specifies that the first TBS 412 is to be determined based on the first set of parameters 422.

The method 600 further includes transmitting SCI associated with the TB via the sidelink, at 604. The SCI includes a TBS adjustment value associated with the first TBS. To illustrate, the transmitter 416 may be configured to transmit the SCI 432 via the sidelink 150, and the SCI 432 may include the TBS adjustment value 152 associated with the first TBS 412.

Figure 7:
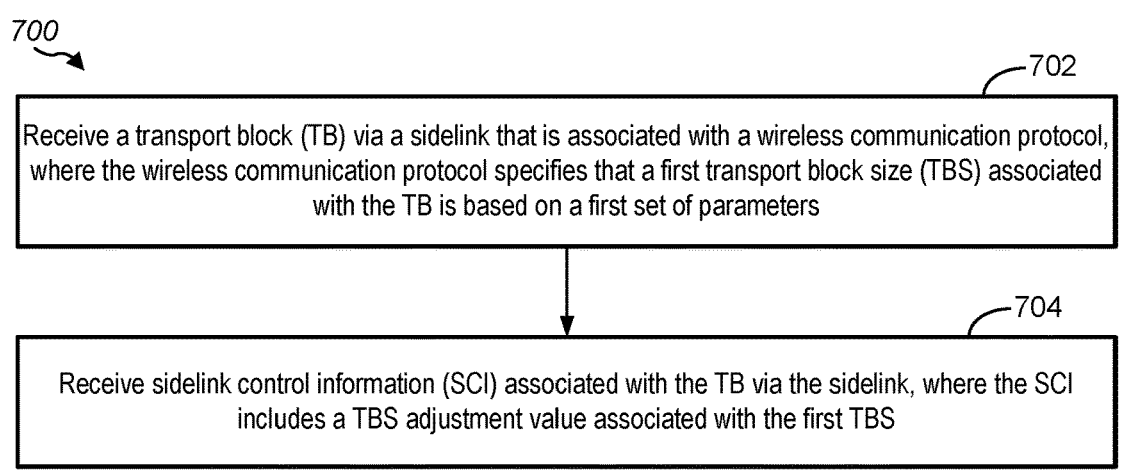
FIG. 7 is a flow diagram illustrating another example of a method of wireless communication according to some aspects of the disclosure.

FIG. 7 is a flow diagram of a method 700 of wireless communication according to some aspects of the disclosure. In some examples, the method 700 is performed by a receiving device of a TB, such as by the UE 115j, by the first receiving device 550, or by the second receiving device 560.

The method 700 includes receiving a TB via a sidelink that is associated with a wireless communication protocol, at 702. The wireless communication protocol specifies that a first TBS associated with the TB is based on a first set of parameters. To illustrate, the receiver 458 may be configured to receive the TB 430 via the sidelink 150. The sidelink 150 may be associated with a V2X wireless communication protocol that specifies that the first TBS 412 is to be determined based on the first set of parameters 422.

The method 700 further includes receiving SCI associated with the TB via the sidelink, at 704. The SCI includes a TBS adjustment value associated with the first TBS. To illustrate, the receiver 458 may be configured to receive the SCI 432 via the sidelink 150, and the SCI 432 may include the TBS adjustment value 152 associated with the first TBS 412.

Figure 8:
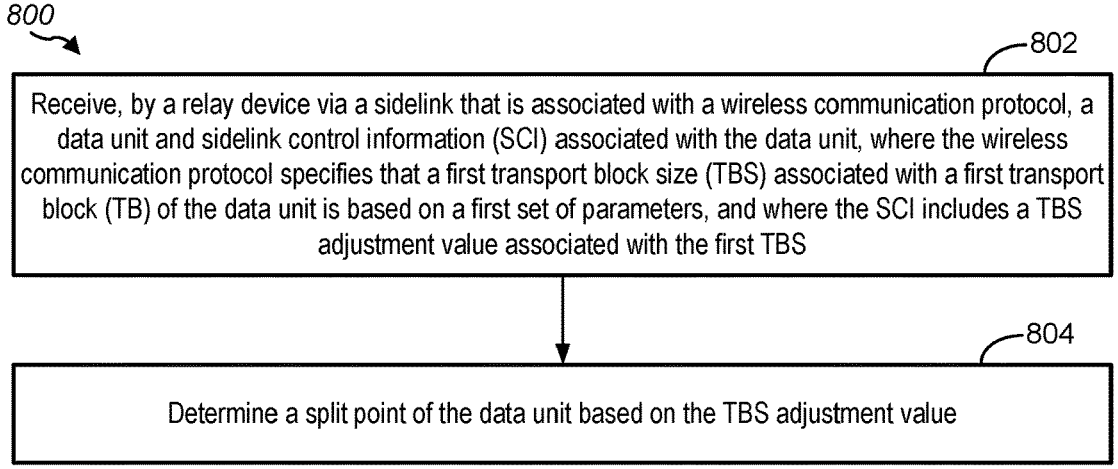
FIG. 8 is a flow diagram illustrating another example of a method of wireless communication according to some aspects of the disclosure.

FIG. 8 is a flow diagram of a method 800 of wireless communication according to some aspects of the disclosure. In some implementations, the method 800 is performed by a relay device, such as by the relay device 520.

The method 800 includes receiving, by a relay device via a sidelink that is associated with a wireless communication protocol, a data unit and sidelink control information (SCI) associated with the data unit, at 802. The wireless communication protocol specifies that a first TBS associated with a first TB of the data unit is based on a first set of parameters, and the SCI includes a TBS adjustment value associated with the first TBS. To illustrate, the relay device 520 may receive the PHY SDU 510 and the SCI 432 from the source device 502 via the sidelink 150. The sidelink 150 may be associated with a V2X wireless communication protocol that specifies that the first TBS 412 is to be determined based on the first set of parameters 422, and the SCI 432 may include the TBS adjustment value 152 associated with the first TBS 412.

The method 800 further includes determining a split point of the data unit based on the TBS adjustment value, at 804. For example, the relay device 520 may determine the split point 590 of the PHY SDU 510 based on the TBS adjustment value 152.

Figure 9:
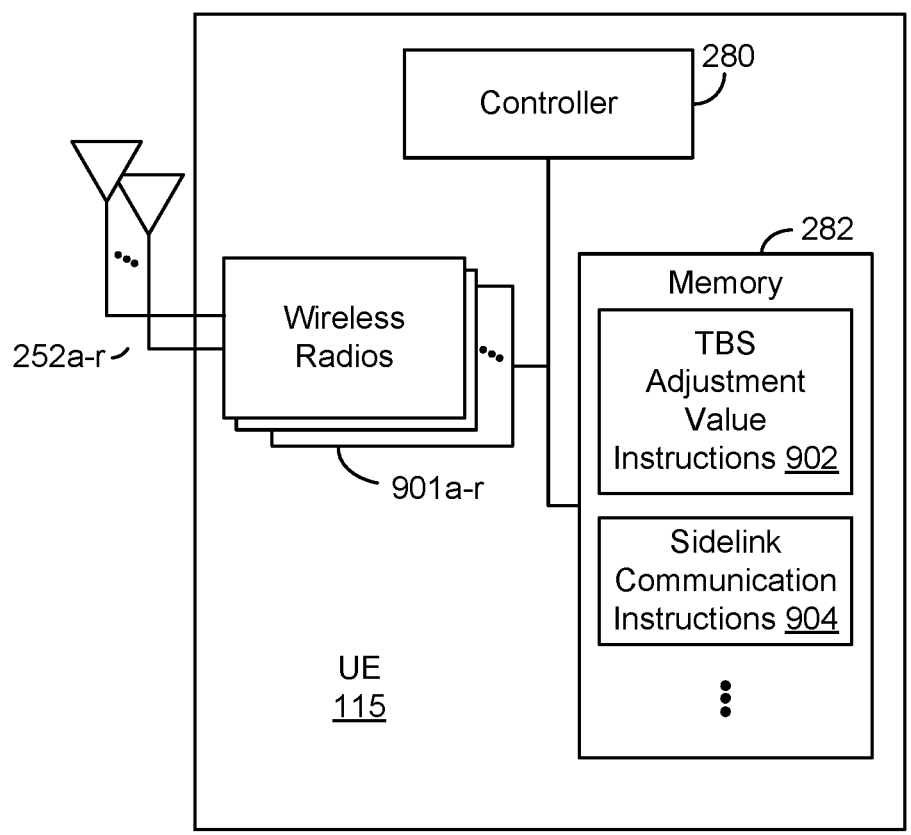
FIG. 9 is a block diagram of an example of a UE according to some aspects of the disclosure.

FIG. 9 is a block diagram illustrating an example of a UE 115 according to some aspects of the disclosure. The UE 115 may include structure, hardware, or components illustrated in FIG. 2. For example, the UE 115 may include the controller 280, which may execute instructions stored in the memory 282. Using the controller 280, the UE 115 may transmit and receive signals via wireless radios 901a-r and the antennas 252a-r. The wireless radios 901a-r may include one or more components or devices described herein, such as the modulator/demodulators 254a-r, the MIMO detector 256, the receive processor 258, the transmit processor 264, the TX MIMO processor 266, the transmitter 416, the receiver 418, the transmitter 456, the receiver 458, one or more other components or devices, or a combination thereof.

The memory 282 may store instructions executable by the controller 280 to initiate, perform, or control one or more operations described herein. To illustrate, the memory 282 may store TBS adjustment value instructions 902 executable by the controller 280 to determine the TBS adjustment value 152 using one or more operations described herein (such as one or more operations described with reference to the UE 115j). Alternatively or in addition, the controller 280 may execute the TBS adjustment value instructions 902 to determine the second TBS 414 upon receiving the TBS adjustment value 152 (e.g., by the UE 115k). The memory 282 may also store sidelink communication instructions 904 executable by the controller 280 to transmit or receive signals via the sidelink 150, such as the TB 430 and the SCI 432.

Figure 10:
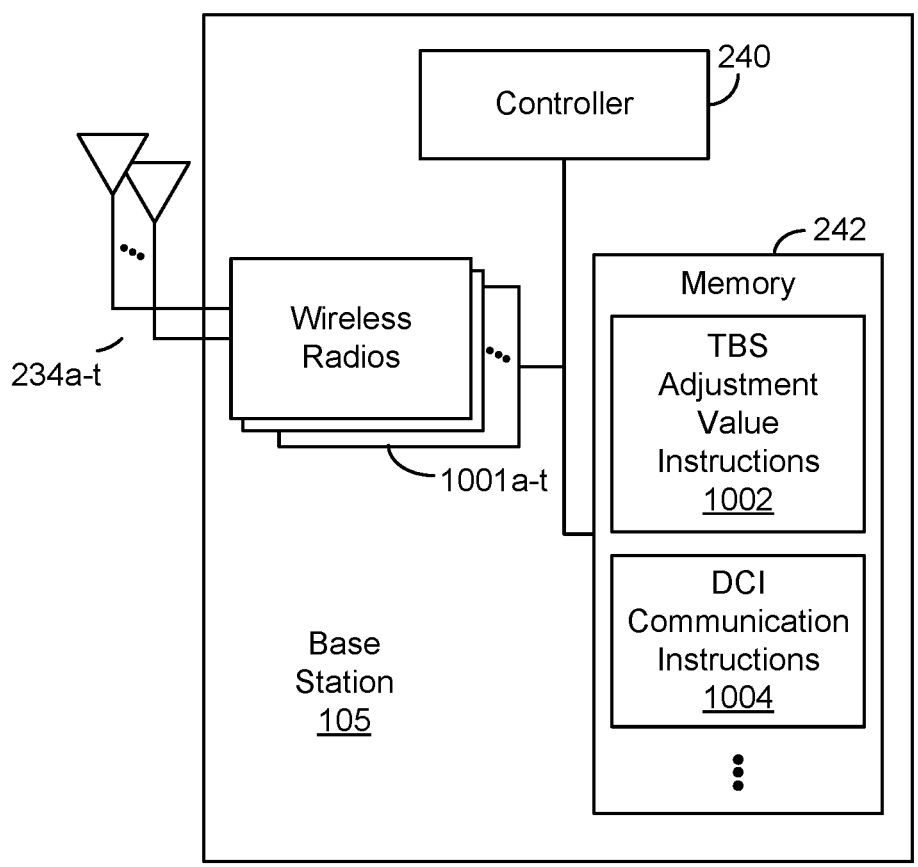
FIG. 10 is a block diagram of an example of a base station according to some aspects of the disclosure.

FIG. 10 is a block diagram illustrating an example of a base station 105 according to some aspects of the disclosure. The base station 105 may include structure, hardware, and components illustrated in FIG. 2. For example, the base station 105 may include the controller 240, which may execute instructions stored in memory 242. Using the controller 240, the base station 105 may transmit and receive signals via wireless radios 1001*a*1-*t* and the antennas 234*a*1-*t*. The wireless radios 1001*a*1-*t* may include one or more components or devices described herein, such as the modulator/demodulators 232*a*1-*t*, the MIMO detector 236, the receive processor 238, the transmit processor 220, the TX MIMO processor 230, one or more other components or devices, or a combination thereof.

The memory 242 may store instructions executable by the controller 240 to initiate, perform, or control one or more operations described herein. To illustrate, the memory 242 may store TBS adjustment value instructions 1002 executable by the controller 240 to determine the TBS adjustment value 152 using one or more operations described herein (such as one or more operations described with reference to the UE 115*j*). As another example, the memory 242 may store DCI communication instructions 1004 executable by the controller 240 to initiate transmission of DCI, such as DCI indicating an order of applying the scaling factor 434 and an offset (e.g., the TBS offset value 436 or the overhead parameter offset value 438).

To further illustrate certain aspects of the disclosure, in a first aspect, an apparatus for wireless communication includes a receiver and a transmitter. The transmitter is configured to transmit of a TB via a sidelink that is associated with a wireless communication protocol. The wireless communication protocol specifies that a first TBS associated with the TB is based on a first set of parameters. The transmitter is further configured to transmit SCI associated with the TB via the sidelink, and the SCI includes a TBS adjustment value associated with the first TBS.

In a second aspect, alone or in combination with the first aspect, the TB corresponds to an initial transmission of the TB.

In a third aspect, alone or in combination with one or more of the first aspect or the second aspect, the TB corresponds to a retransmission of the TB.

In a fourth aspect, alone or in combination with one or more of the first aspect through the third aspect, CSI associated with the TB is based on a retransmission format irrespective of whether the TB corresponds to an initial transmission or a retransmission.

In a fifth aspect, alone or in combination with one or more of the first aspect through the fourth aspect, the TBS adjustment value includes a scaling factor to be applied to the first TBS.

In a sixth aspect, alone or in combination with one or more of the first aspect through the fifth aspect, the TBS adjustment value includes a TBS offset value indicating a change in a TBS index value corresponding to the first TBS.

In a seventh aspect, alone or in combination with one or more of the first aspect through the sixth aspect, the TBS adjustment value includes an overhead parameter offset value indicating a change in a number of bits associated with an overhead parameter of the first set of parameters.

In an eighth aspect, alone or in combination with one or more of the first aspect through the seventh aspect, the SCI further includes one or more control bits configured by RRC signaling, and a value the one or more control bits indicates whether the TBS adjustment value indicates a scaling factor associated with the first TBS or an offset associated with the first TBS.

In a ninth aspect, alone or in combination with one or more of the first aspect through the eighth aspect, the TBS adjustment value indicates a scaling factor associated with the first TBS and further indicates an offset associated with the first TBS.

In a tenth aspect, alone or in combination with one or more of the first aspect through the ninth aspect, an order of applying the scaling factor and the offset is specified by the wireless communication protocol.

In an eleventh aspect, alone or in combination with one or more of the first aspect through the tenth aspect, an order of applying the scaling factor and the offset is determined using RRC signaling.

In a twelfth aspect, alone or in combination with one or more of the first aspect through the eleventh aspect, an order of applying the scaling factor and the offset is indicated using DCI.

In a thirteenth aspect, alone or in combination with one or more of the first aspect through the twelfth aspect, an order of applying the scaling factor and the offset is indicated by the SCI.

In a fourteenth aspect, alone or in combination with one or more of the first aspect through the thirteenth aspect, the TB is transmitted via a data unit that includes the TB and a second TB, the TB is to be provided to a first receiving device via a relay device, the second TB is to be provided to a second receiving device via the relay device, and the relay device is to separate the TB from the second TB at a split point that is based on the TBS adjustment value.

In a fifteenth aspect, alone or in combination with one or more of the first aspect through the fourteenth aspect, the relay device is to provide the TBS adjustment value to the first receiving device, the relay device is to provide second SCI associated with the second TB to the second receiving device, and the second SCI includes a second TBS adjustment value associated with the second TB In a sixteenth aspect, alone or in combination with one or more of the first aspect through the fifteenth aspect, the first receiving device and the second receiving device correspond to logical devices of a single device, the first receiving device is associated with a first component carrier (CC), the second receiving device is associated with a second CC different than the first CC, and wherein the relay device is to provide the SCI and the TBS adjustment value to both the first receiving device and the second receiving device to schedule the first CC and the second CC In a seventeenth aspect, alone or in combination with one or more of the first aspect through the sixteenth aspect, a method of wireless communication includes receiving a TB via a sidelink that is associated with a wireless communication protocol. The wireless communication protocol specifies that a first TBS associated with the TB is based on a first set of parameters. The method further includes receiving SCI associated with the TB via the sidelink. The SCI includes a TBS adjustment value associated with the first TBS.

In an eighteenth aspect, alone or in combination with one or more of the first aspect through the seventeenth aspect, an apparatus for wireless communication includes a transmitter and a receiver. The receiver is configured to receive a TB via a sidelink that is associated with a wireless communication protocol. The wireless communication protocol specifies that a first TBS associated with the TB is based on a first set of parameters. The receiver is further configured to receive SCI associated with the TB via the sidelink, and the SCI includes a TBS adjustment value associated with the first TBS.

In a nineteenth aspect, alone or in combination with one or more of the first aspect through the eighteenth aspect, the TB corresponds to an initial transmission of the TB.

In a twentieth aspect, alone or in combination with one or more of the first aspect through the nineteenth aspect, the TB corresponds to a retransmission of the TB.

In a twenty-first aspect, alone or in combination with one or more of the first aspect through the twentieth aspect, CSI associated with the TB is based on a retransmission format irrespective of whether the TB corresponds to an initial transmission or a retransmission.

In a twenty-second aspect, alone or in combination with one or more of the first aspect through the twenty-first aspect, the TBS adjustment value includes a scaling factor to be applied to the first TBS.

In a twenty-third aspect, alone or in combination with one or more of the first aspect through the twenty-second aspect, the TBS adjustment value includes a TBS offset value indicating a change in a TBS index value corresponding to the first TBS.

In a twenty-fourth aspect, alone or in combination with one or more of the first aspect through the twenty-third aspect, the TBS adjustment value includes an overhead parameter offset value indicating a change in a number of bits associated with an overhead parameter of the first set of parameters.

In a twenty-fifth aspect, alone or in combination with one or more of the first aspect through the twenty-fourth aspect, the SCI further includes one or more control bits configured by RRC signaling, and a value the one or more control bits indicates whether the TBS adjustment value indicates a scaling factor associated with the first TBS or an offset associated with the first TBS.

In a twenty-sixth aspect, alone or in combination with one or more of the first aspect through the twenty-fifth aspect, the TBS adjustment value indicates a scaling factor associated with the first TBS and further indicates an offset associated with the first TBS.

In a twenty-seventh aspect, alone or in combination with one or more of the first aspect through the twenty-sixth aspect, an order of applying the scaling factor and the offset is specified by the wireless communication protocol.

In a twenty-eighth aspect, alone or in combination with one or more of the first aspect through the twenty-seventh aspect, an order of applying the scaling factor and the offset is determined using radio resource control (RRC) signaling.

In a twenty-ninth aspect, alone or in combination with one or more of the first aspect through the twenty-eighth aspect, an order of applying the scaling factor and the offset is indicated using downlink control information (DCI) or by the SCI.

In a thirtieth aspect, alone or in combination with one or more of the first aspect through the twenty-ninth aspect, a method of wireless communication includes transmitting a TB via a sidelink that is associated with a wireless communication protocol. The wireless communication protocol specifies that a first TBS associated with the TB is based on a first set of parameters. The method further includes transmitting SCI associated with the TB via the sidelink. The SCI includes a TBS adjustment value associated with the first TBS.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein may include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and operations described in connection with the disclosure herein may be implemented as electronic hardware, computer software, or combinations of both. To illustrate, various illustrative components, blocks, modules, circuits, and steps are described in terms of functionality. Whether such functionality is implemented as hardware or software depends upon the particular application and design parameters of the overall system. Skilled artisans may implement the described functionality in varying ways for each particular application, but such implementation decisions should not be interpreted as causing a departure from the scope of the disclosure. Skilled artisans will also readily recognize that the order or combination of components, methods, or interactions that are described herein are examples and that the components, methods, or interactions of the various aspects of the disclosure may be combined or performed in ways other than those illustrated and described.

The various illustrative devices, logical blocks, modules, circuits and operations described herein may be implemented as electronic hardware, computer software, or combinations of both. Whether such functionality is implemented in hardware or software depends upon the particular application and design constraints imposed on the overall system.

The hardware and data processing apparatus used to implement the various illustrative devices, logical blocks, modules, and circuits described herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described herein also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The operations of a method or process described herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or process may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, the apparatus comprising:
   a receiver; and
   a transmitter configured to:
      transmit, via a sidelink that is associated with a wireless communication protocol, a data unit that includes a first transport block (TB) and a second TB, wherein the wireless communication protocol specifies that a first transport block size (TBS) associated with the first TB is based on a first set of parameters; and
      transmit sidelink control information (SCI) associated with the first TB via the sidelink, wherein the SCI includes a TBS adjustment value associated with the first TBS, and wherein a relay device is to separate the first TB from the second TB at a split point that is based on the TBS adjustment value.

2. The apparatus of claim 1, wherein the first TB corresponds to an initial transmission of the first TB.

3. The apparatus of claim 1, wherein the first TB corresponds to a retransmission of the first TB.

4. The apparatus of claim 1, wherein channel state information (CSI) associated with the first TB is based on a retransmission format irrespective of whether the first TB corresponds to an initial transmission or a retransmission.

5. The apparatus of claim 1, wherein the TBS adjustment value includes a scaling factor to be applied to the first TBS.

6. The apparatus of claim 1, wherein the TBS adjustment value includes a TBS offset value indicating a change in a TBS index value corresponding to the first TBS.

7. The apparatus of claim 1, wherein the TBS adjustment value includes an overhead parameter offset value indicating a change in a number of bits associated with an overhead parameter of the first set of parameters.

8. The apparatus of claim 1, wherein the SCI further includes one or more control bits configured by radio resource control (RRC) signaling, and wherein a value the one or more control bits indicates whether the TBS adjustment value indicates a scaling factor associated with the first TBS or an offset associated with the first TBS.

9. The apparatus of claim 1, wherein the TBS adjustment value indicates a scaling factor associated with the first TBS and further indicates an offset associated with the first TBS.

10. The apparatus of claim 9, wherein an order of applying the scaling factor and the offset is specified by the wireless communication protocol.

11. The apparatus of claim 9, wherein an order of applying the scaling factor and the offset is determined using radio resource control (RRC) signaling.

12. The apparatus of claim 9, wherein an order of applying the scaling factor and the offset is indicated using downlink control information (DCI).

13. The apparatus of claim 9, wherein an order of applying the scaling factor and the offset is indicated by the SCI.

14. The apparatus of claim 1, wherein the first TB is to be provided to a first receiving device via the relay device, and wherein the second TB is to be provided to a second receiving device via the relay device.

15. The apparatus of claim 14, wherein the relay device is to provide the TBS adjustment value to the first receiving device, wherein the relay device is to provide second SCI associated with the second TB to the second receiving device, and wherein the second SCI includes a second TBS adjustment value associated with the second TB.

16. The apparatus of claim 14, wherein the first receiving device and the second receiving device correspond to logical devices of a single device, wherein the first receiving device is associated with a first component carrier (CC), wherein the second receiving device is associated with a second CC different than the first CC, and wherein the relay device is to provide the SCI and the TBS adjustment value to both the first receiving device and the second receiving device to schedule the first CC and the second CC.

17. A method of wireless communication, the method comprising:
    transmitting, via a sidelink that is associated with a wireless communication protocol, a data unit that includes a first transport block (TB) and a second TB, wherein the wireless communication protocol specifies that a first transport block size (TBS) associated with the first TB is based on a first set of parameters; and
    transmitting sidelink control information (SCI) associated with the first TB via the sidelink, wherein the SCI includes a TBS adjustment value associated with the first TBS, and wherein a relay device is to separate the first TB from the second TB at a split point that is based on the TBS adjustment value.

18. An apparatus for wireless communication, the apparatus comprising:
    a transmitter; and
    a receiver configured to:
        receive a first transport block (TB) via a sidelink that is associated with a wireless communication protocol, wherein the wireless communication protocol specifies that a first transport block size (TBS) associated with the first TB is based on a first set of parameters; and
        receive sidelink control information (SCI) associated with the first TB via the sidelink, wherein the SCI includes a TBS adjustment value associated with the first TBS, wherein the first TB is transmitted via a data unit that includes the first TB and a second TB, and wherein a relay device separates the first TB from the second TB at a split point that is based on the TBS adjustment value.

19. The apparatus of claim 18, wherein the first TB corresponds to an initial transmission of the first TB.

20. The apparatus of claim 18, wherein the first TB corresponds to a retransmission of the first TB.

21. The apparatus of claim 18, wherein channel state information (CSI) associated with the first TB is based on a retransmission format irrespective of whether the first TB corresponds to an initial transmission or a retransmission.

22. The apparatus of claim 18, wherein the TBS adjustment value includes a scaling factor to be applied to the first TBS.

23. The apparatus of claim 18, wherein the TBS adjustment value includes a TBS offset value indicating a change in a TBS index value corresponding to the first TBS.

24. The apparatus of claim 18, wherein the TB S adjustment value includes an overhead parameter offset value indicating a change in a number of bits associated with an overhead parameter of the first set of parameters.

25. The apparatus of claim 18, wherein the SCI further includes one or more control bits configured by radio resource control (RRC) signaling, and wherein a value the one or more control bits indicates whether the TBS adjustment value indicates a scaling factor associated with the first TBS or an offset associated with the first TBS.

26. The apparatus of claim 18, wherein the TBS adjustment value indicates a scaling factor associated with the first TBS and further indicates an offset associated with the first TBS.

27. The apparatus of claim 26, wherein an order of applying the scaling factor and the offset is specified by the wireless communication protocol.

28. The apparatus of claim 26, wherein an order of applying the scaling factor and the offset is determined using radio resource control (RRC) signaling.

29. The apparatus of claim 26, wherein an order of applying the scaling factor and the offset is indicated using downlink control information (DCI) or by the SCI.

30. A method of wireless communication, the method comprising:
    receiving a first transport block (TB) via a sidelink that is associated with a wireless communication protocol, wherein the wireless communication protocol specifies that a first transport block size (TBS) associated with the first TB is based on a first set of parameters; and
    receiving sidelink control information (SCI) associated with the first TB via the sidelink, wherein the SCI includes a TBS adjustment value associated with the first TBS, wherein the first TB is transmitted via a data unit that includes the first TB and a second TB, and wherein a relay device separates the first TB from the second TB at a split point that is based on the TB S adjustment value.

\* \* \* \* \*